United States Patent Office 3,054,794
Patented Sept. 18, 1962

3,054,794
PROCESS FOR PREPARING 3-(AMINOALKYL)-OXAZOLIDINE-2,4-DIONES
Seymour L. Shapiro, Hastings on Hudson, Louis Freedman, Bronxville, and Ira M. Rose, Yonkers, N.Y., assignors to U.S. Vitamin & Pharmaceutical Corporation, a corporation of Delaware
No Drawing. Filed Jan. 17, 1958, Ser. No. 709,456
1 Claim. (Cl. 260—247.2)

This invention relates to new and useful oxazolidinediones of the structure shown below

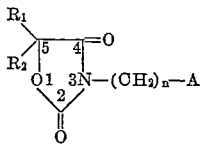

and to processes of making same.

More particularly, this invention relates to novel syntheses of the structure I shown above, wherein $R_1$ and $R_2$ are hydrogen or lower alkyl, and $n$ may be 3–6, and preferably 3–4; and A is a secondary amino component which may be represented as —$NR_3R_4$. $R_3$ and $R_4$ are lower alkyl, cycloalkyl, arylalkyl, haloarylalkyl or aryl, alike or different; thus with the attached N forming such radicals as dimethylamino, methylisopropylamino, diethylamino, methylbenzylamino, ethylcyclohexylamino, methyl($\alpha$-methylphenethyl)amino, and ethyl anilino. The secondary amino radical —$NR_3R_4$ also includes those radicals in which $R_3$ and $R_4$ are joined directly or through an oxygen atom to form N-heterocyclic radicals having 5–7 ring atoms illustrated by 1-piperidino, 1-pyrrolidino, 1-hexamethylenimino, 4-morpholino and the like; and also includes such arylalkylamine structures such as indolinyl, tetrahydroquinolinyl, tetrahydroisoquinolinyl and the like.

It is the object of this invention to provide a direct single step synthesis for structure of the type I by reacting the appropriate $\alpha$-hydroxy ester $$R_1R_2C(OH)COOY$$

where Y is a lower alkyl group, suitably methyl or ethyl, with the substituted alkylamine, A—$(CH_2)_n$—$NH_2$, and a di- lower alkyl carbonate, O=C—$(OZ)_2$, where Z represents a lower alkyl, said dialkyl carbonate being suitably dimethyl carbonate or diethyl carbonate.

In this process the dialkyl carbonate is used as the solvent, in the presence of a catalytic amount of an alkali metal (preferably sodium) in solution in a lower alcohol. In the practice of this invention we have preferred to use the economically available ethyl carbonate and sodium in ethanol. Other examples of suitable alkaline catalysts are powdered sodium methoxide, potassium or lithium in a lower alcohol, benzyl-trimethylammonium methoxide in methanol, and the like.

A typical synthesis of I wherein Y and Z are ethyl, is shown below

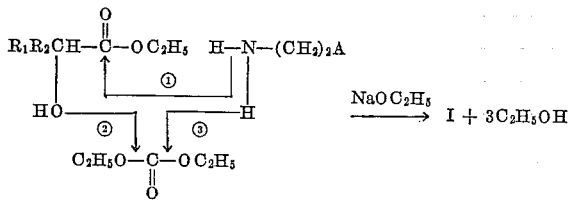

Whilst explanation of the exact mechanism of the reaction is not within the scope and responsibility of this invention, it is believed that the reaction proceeds as a series of correlated steps following the numerical sequence as shown in the arrows. The initial reactions may involve incipient formation of the $\alpha$-hydroxyamide $$R_1R_2CHOHCONH(CH_2)_nA$$

(Step 1), then formation of the carbonate ester (Step 2), followed by cyclization (Step 3) to the 5,5—$R_1R_2$—3[A$(CH_2)_n$] - oxazolidine-2,4-dione, I, with the removal of the formed alcohol (here ethanol), driving the reaction to completion. It is believed that the driving force of the forward reaction to effect the preparation of the substituted oxazolidinedione is more favorable when all of the components can mutually react as shown above.

The reaction proceeds favorably at the reflux point of the mixed reactants and solvent, dialkyl carbonate. Lower reaction temperatures do not contribute any desirable effects.

The process is advantageously carried out as follows: Equimolar quantities of the amine and $\alpha$-hydroxy ester are dissolved in 1–3 volumes of diethyl carbonate, and sodium in ethanol, about 0.05–0.2 equivalent added. This reaction mixture is refluxed for about one hour. The formed ethanol and added ethanol are removed by distillation, giving a quantitative estimate of the progress of the reaction. Volatiles are then removed and the residue consisting of the product distilled.

In contrast to this procedure, methods available as the prior art require that the sodium salt of the oxazolidinedione unsubstituted in the 3-position be prepared and then reacted with an active halide according to the equation

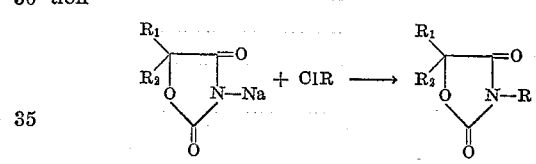

However, the reaction conditions are not as cleancut and the required substituted aminoalkyl halides are not as readily accessible, not as readily purified and not as stable as the substituted aminoalkylamines which are the required reactant in our process. Furthermore, the sodium salt of the oxazolidinediones is not as accessible or economical as the $\alpha$-hydroxy esters used in our process; and the sodium salt of the oxazolidinediones does not react efficiently with any but the more active halides. Thus, the procedures so far described in the literature are deficient in synthetic scope as compared to the obvious range of synthetic practicality of the method herein described. In addition to these advantages inherent in the workability of the process, the synthetic scope of the method is apparent when the accessibility of the reactant dialkylaminoalkylamines is considered. Thus, the well known cyanoethylation of secondary amines with acrylonitrile affords the $\beta$-disubstituted aminopropionitrile, which in turn is readily reduced to the requisite reactant amine.

As representative, but not limiting, the compounds of Type I which have been prepared are shown below in Table I, it being understood that though the compounds are shown in the form of bases, their acid and quaternary ammonium salts are also intended to be within the invention and covered by the claims appended to this specification. The group which had been used as the acidifying, or quaternarizing group is designated in Table I as $R_5$, with $R_5$ being H when an acid salt is formed, and $R_5$ being alkyl when a quaternary salt is formed. The anion resulting from the salt formation has been designated as X.

It will also be understood that when $R_1$ and $R_2$ are not the same, that the carbon atom 5 of the oxazolidinedione ring system is asymmetric, and such stereoisomers which may be isolated by familiar procedures are within the purview of this invention.

TABLE I
3-(Disubstituted Aminoalkyl)-Oxazolidine-2,4-Diones

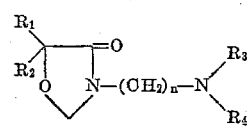

$R_1$ and $R_2$=H, n=3

| $R_3$ | $R_4$ | $R_5$ | X | Boiling pt. °C. | Microns pressure | M.P. °C. |
|---|---|---|---|---|---|---|
| $CH_3$ | $CH_3$ | | | 80- 3 | 40- 50 | |
| $CH_3$ | $CH_3$ | $CH_3$ | I | | | 218 - 9 |
| $C_2H_5$ | $C_2H_5$ | | | 95 | 45 | |
| $C_2H_5$ | $C_2H_5$ | $CH_3$ | I | | | 150 - 1 |
| i-$C_3H_7$ | $CH_3$ | | | 100- 2 | 50 | |
| n-$C_4H_9$ | n-$C_4H_9$ | | | 136- 8 | 300 | |
| —$(CH_2)_4$— | | | | 110 | 30 | |
| —$(CH_2)_4$— | | $CH_3$ | I | | | 203 - 4 |
| —$(CH_2)_2$—O—$(CH_2)_2$— | | | | 136- 9 | 280 | 63 - 4 |
| —$(CH_2)_2$—O—$(CH_2)_2$— | | $CH_3$ | I | | | 230 - 1 |
| Cyclohexyl | $CH_3$ | | | 146- 50 | 500 | |
| Cyclohexyl | $C_2H_5$ | | | 138- 40 | 110- 40 | |
| Φ—$CH_2$ | $CH_3$ | | | 170- 9 | 700 | |
| Φ—$CH_2$ | i-$C_3H_7$ | | | 170- 4 | 150-220 | |
| Φ—$CH_2$—CH—$CH_3$— | $CH_3$ | | | 170- 5 | 500 | |
| ⌬—$(CH_2)_2$— | | | | 182- 4 | 310- 70 | |
| Φ | $CH_3$ | | | 172- 8 | 70- 80 | |
| Φ | $C_2H_5$ | | | 188- 90 | 650-700 | |

$R_1$=$CH_3$, $R_2$=H, n=3

| $R_3$ | $R_4$ | $R_5$ | X | Boiling pt. °C. | Microns pressure | M.P. °C. |
|---|---|---|---|---|---|---|
| $CH_3$ | $CH_3$ | | | 76 | 30 | |
| $CH_3$ | $CH_3$ | $CH_3$ | I | | | 171 - 2 |
| $CH_3$ | $CH_3$ | $CH_2$=CH—$CH_2$ | Br | | | 190 - 5 |
| $C_2H_5$ | $C_2H_5$ | | | 87-100 | 40 | |
| $C_2H_5$ | $C_2H_5$ | $CH_3$ | I | | | 128.5- 9.5 |
| i-$C_3H_7$ | $CH_3$ | | | 90- 2 | 80 | |
| n-$C_4H_9$ | n-$C_4H_9$ | | | 128 | 170 | |
| —$(CH_2)_4$— | | | | 102 | 20 | |
| —$(CH_2)_4$— | | $CH_3$ | I | | | 181 - 2 |
| —$(CH_2)_2$—O—$(CH_2)_2$— | | H | Cl | | | 218 - 9 |
| —$(CH_2)_2$—O—$(CH_2)_2$— | | $CH_3$ | I | | | 224 - 7 |
| Cyclohexyl | $CH_3$ | | | 134- 8 | 80- 90 | |
| Cyclohexyl | $C_2H_5$ | | | 130- 6 | 50 | |
| Φ—$CH_2$ | $CH_3$ | | | 145- 6 | 80 | |
| Φ—$CH_2$ | i-$C_3H_7$ | | | 156- 8 | 100 | |
| Φ—$CH_2$—CH—$CH_3$— | $CH_3$ | | | 160- 4 | 30 | |
| ⌬—$(CH_2)_2$— | | | | 168 | 60 | |
| Φ | $CH_3$ | | | 158- 64 | 80-120 | |
| Φ | $C_2H_5$ | | | 154- 70 | 30- 50 | |

TABLE I—Continued $R_1$ and $R_2$=$CH_3$, n=3

| $R_3$ | $R_4$ | $R_5$ | X | Boiling pt. °C. | Microns pressure | M.P. °C. |
|---|---|---|---|---|---|---|
| $CH_3$ | $CH_3$ | | | 67- 8 | 30 | |
| $CH_3$ | $CH_3$ | $CH_3$ | I | | | 233 - 4 |
| $CH_3$ | $CH_3$ | $C_2H_5$ | I | | | 153.5-55 |
| $C_2H_5$ | $C_2H_5$ | | | 82- 6 | 30 | |
| $C_2H_5$ | $C_2H_5$ | $CH_3$ | I | | | 121 - 2 |
| i-$C_3H_7$ | $CH_3$ | | | 88 | 50 | |
| n-$C_4H_9$ | n-$C_4H_9$ | | | 116 | 50 | |
| n-$C_4H_9$ | n-$C_4H_9$ | $CH_3$ | I | | | 101 - 2 |
| —$(CH_2)_4$— | | | | 94 | 40 | |
| —$(CH_2)_4$— | | $CH_3$ | I | | | 123 - 5 |
| —$(CH_2)_2$—O—$(CH_2)_2$— | | | | 124- 30 | 50 | |
| —$(CH_2)_2$—O—$(CH_2)_2$— | | H | Cl | | | 202 - 3 |
| —$(CH_2)_2$—O—$(CH_2)_2$— | | $CH_3$ | I | | | 200 - 1 |
| Cyclohexyl | $CH_3$ | | | | | 49 -50 |
| Cyclohexyl | $C_2H_5$ | | | 130- 2 | 40 | |
| Φ—$CH_2$ | $CH_3$ | | | 140 | 50 | |
| Φ—$CH_2$ | i-$C_3H_7$ | | | 146- 8 | 30 | |
| Φ—$CH_2$—CH—$CH_3$— | $CH_3$ | | | 156- 8 | 10 | |
| (benzene ring)—$(CH_2)_2$— | | | | 164 | 30 | |
| Φ | $CH_3$ | | | 146- 8 | 30 | |
| Φ | $C_2H_5$ | | | 156- 7 | 60 | |

$R_1$ and $R_2$=H, n=4

| $R_3$ | $R_4$ | $R_5$ | X | °C. | Microns | M.P. °C. |
|---|---|---|---|---|---|---|
| $CH_3$ | $CH_3$ | | | 104 | 80 | |
| $CH_3$ | $CH_3$ | $CH_3$ | I | | | 188 - 9 |
| $C_2H_5$ | $C_2H_5$ | | | 114 | 100 | |
| $C_2H_5$ | $C_2H_5$ | $CH_3$ | I | | | 87 - 9 |
| i-$C_3H_7$ | i-$C_3H_7$ | | | 130 | 200 | |
| i-$C_3H_7$ | i-$C_3H_7$ | $CH_3$ | I | | | 136 - 7 |
| n-$C_4H_9$ | n-$C_4H_9$ | | | 138 | 60 | |

$R_1$=$CH_3$, $R_2$=H, n=4

| $R_3$ | $R_4$ | $R_5$ | X | °C. | Microns | M.P. °C. |
|---|---|---|---|---|---|---|
| $CH_3$ | $CH_3$ | | | 93 | 50 | |
| $CH_3$ | $CH_3$ | $CH_3$ | I | | | 235 - 6 |
| $C_2H_5$ | $C_2H_5$ | | | 100 | 40 | |
| i-$C_3H_7$ | i-$C_3H_7$ | | | 110- 11 | 40 | |
| n-$C_4H_9$ | n-$C_4H_9$ | | | 135- 7 | 50 | |

$R_1$ and $R_2$=$CH_3$, n=4

| $R_3$ | $R_4$ | $R_5$ | X | °C. | Microns | M.P. °C. |
|---|---|---|---|---|---|---|
| $CH_3$ | $CH_3$ | | | 82 | 30 | |
| $CH_3$ | $CH_3$ | $CH_3$ | I | | | 237 - 8 |
| $CH_3$ | $CH_3$ | p-ClΦ—$CH_2$ | Cl | | | 176 -81 |
| $C_2H_5$ | $C_2H_5$ | | | 93- 6 | 30 | |
| i-$C_3H_7$ | i-$C_3H_7$ | | | 106 | 30 | |
| i-$C_3H_7$ | i-$C_3H_7$ | $CH_3$ | I | | | 156 - 7 |
| n-$C_4H_9$ | n-$C_4H_9$ | | | 130 | 70 | |

The amines of the type

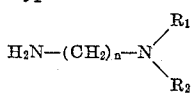

were either available commercially, or the compounds where $n$=3 were readily preparable by treating acrylonitrile with a secondary amine following established procedures and reducing the formed nitrile with sodium in alcohol or an equivalent reducing agent following established procedures.

Some of the initial reactants prepared are herein described, with the disubstituted aminopropionitriles listed in Table II and the disubstituted aminopropylamines listed in Table III.

ples are given for purposes of illustration, it being understood that the scope of the invention is shown by the claims hereinafter set forth.

TABLE II
*Disubstituted Aminopropionitriles*

$$R_3 \diagdown N-CH_2-CH_2-CN \diagup R_4$$

| $R_3$ | $R_4$ | M.P., °C. | Boiling pt. °C. | Boiling pt. Microns pressure | Literature reference |
|---|---|---|---|---|---|
| Cyclohexyl | $CH_3$ | ------ | 74 | 60 | J. Corsi et al., *J. Am. Chem. Soc.* 68: 1906 (1946). |
| Cyclohexyl | $C_2H_5$ | ------ | 64- 8 | 40 | Do. |
| i-$C_3H_7$ | $CH_3$ | ------ | 86 | 8,000 | Do. |
| (phenyl)–$(CH_2)_2$– | | ------ | 112- 8 | 60- 70 | |
| (decahydronaphthyl) | | 157 | -------- | -------- | F. C. Whitmore, *J. Am. Chem. Soc.* 66: 729 (1944). |
| Φ—$CH_2$ | $CH_3$ | ------ | 170 | 16 | J. A. King, *J. Am. Chem. Soc.* 68: 1468 (1946). |
| Φ—$CH_2$ | i-$C_3H_7$ | ------ | 98-100 | 30 | |
| Φ—$CH_2$—$C(CH_3)H$— | $CH_3$ | ------ | 108- 15 | 80-110 | |
| Φ | $CH_3$ | ------ | 110 | 150 | French Patent No. 742,358. |
| Φ | $C_2H_5$ | ------ | 105- 22 | 150 | Do. |

TABLE III
*Disubstituted Aminopropylamines*

$$R_3 \diagdown N-CH_2-CH_2-CH_2-NH_2 \diagup R_4$$

| $R_3$ | $R_4$ | Boiling pt. °C. | Boiling pt. Microns pressure | Literature reference |
|---|---|---|---|---|
| Cyclohexyl | $CH_3$ | 60- 6 | 40- 60 | J. Corsi, *J. Am. Chem. Soc.* 68: 1906 (1946). |
| Cyclohexyl | $C_2H_5$ | 72- 80 | 100- 30 | Do. |
| i-$C_3H_7$ | $CH_3$ | 80 | ¹32 | Do. |
| (phenyl)–$(CH_2)_2$– | | 92-100 | 40- 70 | |
| Φ—$CH_2$ | $CH_3$ | 80- 1 | 100 | |
| Φ—$CH_2$ | i-$C_3H_7$ | 76- 82 | 30-100 | |
| Φ—$CH_2$—$C(CH_3)H$— | $CH_3$ | 100- 4 | 30- 50 | |
| Φ | $CH_3$ | 94 | 50 | F. C. Whitmore, *J. Am. Chem. Soc.* 66: 729 (1944). |
| Φ | $C_2H_5$ | 89 | 10 | |

¹ Mm.

The amines where $n=4$ are available commercially (Sapon Labs., Valley Stream, N.Y.), but are also conveniently synthesized from the commercially accessible γ-bromobutyronitrile by amination of bromine-bearing carbon and reduction of the γ-tertiary aminonitrile to the substituted tertiary aminobutylamine.

Having described our invention, the following examples are given for purposes of illustration, it being understood that the scope of the invention is shown by the claims hereinafter set forth.

EXAMPLE 1

*3-(N - methylanilino)propylamine.*—β(N - methylanilino)propionitrile, 75 g. (0.46 mole), was dissolved in 900 ml. of absolute ethanol and heated to reflux. Sodium 85 g. (3.68 moles) was added, in pieces, as quickly as possible (15–25 min.) and the reflux was continued till all the sodium had dissolved (2–3 hrs.).

The hot solution was steam distilled directly and 900 ml. of distillate removed. The formed product which separated in the pot was removed and dried over potassium hydroxide, filtered and distilled in vacuo, yielding 63.5 g. (85%) of amine boiling at 94°/50µ.

EXAMPLE 2

*3-benzylmethylamino propionitrile.* — N-benzylmethylamine, 72.5 g. (0.60 mole), was mixed with 35.2 g. (excess) of cold acrylonitrile and then 5 drops of "Triton B" solution were added. After refluxing for 4 hours and standing for 16 hours, the reaction mixture was fractionally distilled. There were obtained 93.8 (90%) of product boiling at 170°/16 mm. ("Triton B" is benzyltrimethylammonium hydroxide, 40% in methanol.)

EXAMPLE 3

*3-(1-indolino)propionitrile.* — A solution of 91.5 g. (0.77 mole) of indoline, 45 g. (excess) of acrylonitrile and 25 ml. of glacial acetic acid was refluxed for 2 hours, then cooled and diluted with 1 liter of ether. This solution was washed twice with 80 ml. of 30% potassium carbonate solution. The ether solution was then dried over powdered potassium carbonate, filtered and concentrated on the steam bath. The remaining volatile materials were removed under 1 mm. pressure and the residue distilled in vacuo, yielding 121.5 g. (94%) of product, B.P. 112–118°/0.06–0.07 mm.

*Analysis.*—Calcd. for $C_{11}H_{12}N_2$: C, 76.7; H, 7.0. Found: C, 76.4; H, 6.9.

EXAMPLE 4

*5,5-dimethyl3-(3-[4-morpholino]propyl) -1,3 - oxazolidine-2,4-dione.*—To a solution of 7.2 g. (0.05 mole) of N-(3-aminopropyl)morpholine, 6.6 g. (0.05 mole) of ethyl α-hydroxy-iso-butyrate and 25 ml. of diethyl carbonate, a solution of 0.20 g. (0.0087 mole) of sodium in 4 ml. of ethanol was added and the whole refluxed 1 hour. The formed alcohol was removed by distillation and the residue, after filtration and removal of the diethyl carbonate, was fractionally distilled, yield 89.4% of product.

*Analysis.*—Calcd. for $C_{12}H_{20}N_2O_4$: C, 56.2; H, 7.9; N, 10.9. Found: C, 56.2; H, 8.0; N, 10.7.

The hydrochloride formed in ethanol, crystallized out of solution on dilution with ethyl ether in 63% yield.

The methiodide formed in refluxing ethanol and recrystallized from ethanol in 76% yield.

*Analysis.*—Calcd. for $C_{13}H_{23}N_2O_4I$: C, 39.2; H, 5.8; N, 7.0. Found: C, 39.5; H, 5.9; N, 7.0.

EXAMPLE 5

*3 - (3 - dimethylaminopropyl) - 1,3 - oxazolidine - 2,4-dione.*—This was prepared as in Example 4 from 10.2 g. (0.10 mole) of 3-dimethylaminopropylamine, 10.4 g. (0.10 mole) of ethyl glycolate, 25 ml. of diethyl carbonate, and a solution of 0.10 g. (0.0043 mole) of sodium in 2 ml. of ethanol; yield 63%.

EXAMPLE 6

*3-(3-dibutylaminopropyl)-5-methyl - 1,3 - oxazolidine-2,4-dione.*—This was prepared as in Example 4 from 9.3 g. (0.05 mole) of 3-dibutylaminopropylamine, 5.9 g. (0.05 mole) of ethyl lactate, 25 ml. of diethyl carbonate and a solution of 0.10 g. (0.0043 mole) of sodium in 2 ml. of ethanol; yield 84.5% of product.

EXAMPLE 7

*3-(3-dibutylaminopropyl)-5,5-dimethyl-1,3-oxazolidine-2,4-dione.*—This was prepared as in Example 4 from 9.3 g. (0.05 mole) of 3-dibutylaminopropylamine, 6.6 g. (0.05 mole) of ethyl-α-hydroxy-iso-butyrate, 25 ml. of diethyl carbonate and a solution of 0.20 g. (0.0087 mole) of sodium in 4 ml. of ethanol; yield 83%.

*Analysis.*—Calcd. for $C_{10}H_{30}N_2O_3$: C, 64.4; H, 10.1. Found: C, 64.4; H, 10.1.

The methiodide prepared in refluxing ethanol, crystallized on cooling and dilution with ether in 74.5% yield.

*Analysis.*—Calcd. for $C_{17}H_{33}N_2O_3I$: C, 46.4; H, 7.6; N, 6.4. Found: C, 46.6; H, 7.4; N, 6.4.

Compounds prepared, and described herein have therapeutic properties, particularly as tranquilizing agents. In addition to the free bases, the compounds for such purposes can be transformed to their acid salts with the non-toxic acids, and to their quaternary ammonium salts with lower alkyl halides, and tosylates, as well as the quaternaries with ethylbromoacetate. Many of these have been characterized in Table I.

When applied for therapeutic purposes the compounds are desirably formulated into tablets and sterile solutions for injection.

For the purposes of evaluation of tranquilizing effect at the animal level, two generally accepted tests were used:

(1) Effect on Spontaneous Activity:
  Ref. 1. T. J. Castenara et al., J. Lab. Clin. Med. 45: 825 (1955).
  Ref. 2. W. Isaac and C. T. Ruch, Science 123: 1170 (1956).

(2) Effect on Mescaline Scratch:
  Ref. F. M. Sturtevant, Proc. Soc. Exp. Biol. Med., 92: 383 (1956).

The principles of the use of these tests will be discussed below.

The tranquilizing effects with typical compounds of this invention are described below. An additional critical factor in the consideration of the therapeutic value is the toxicity of the compounds concerned. In general, these toxicities have been established in mice in terms of the minimum dose in milligrams of compound which would be lethal to mice, expressed as kilograms of mouse. These terms are subsequently abbreviated as $LD_{min.}$ mg./kg.

In Table A the compounds to be discussed are given a reference number and their $LD_{min.}$ mg./kg. are shown.

We have compared them with drugs which have wide clinical acceptance to show the significant therapeutic potential of our compounds.

TABLE A

*Derivatives of I*

| Ref. No. | $LD_{min.}$ mg./kg. | $R_1$ | $R_2$ | $R_3$ | $R_4$ | $R_5$ | X | n |
|---|---|---|---|---|---|---|---|---|
| 1 | 1,000 | $CH_3$ | $CH_3$ | $-(CH_2)_2-O-(CH_2)_2-$ | | | | 3 |
| 2 | 1,000 | H | H | $-(CH_2)_2-O-(CH_2)_2-$ | | | | 3 |
| 3 | 1,000 | $CH_3$ | H | $CH_3$ | $CH_3$ | $CH_3$ | I | 3 |
| 4 | 500 | H | H | $C_2H_5$ | $C_2H_5$ | $CH$ | I | 3 |

*Control Compounds*

[For puposes of comparison]

| | | | |
|---|---|---|---|
| $C_1$ | 750 | Meprobamate | 2-methyl-2-n-propyl-1,3-propanediol dicarbamate. |
| $C_2$ | 100 | Promazine | 10-(3-dimethylaminopropyl)phenothiazine hydrochloride. |
| $C_3$ | (¹) | Chlorpromazine | 10-(3-dimethylaminopropyl)-2-chlorophenothiazine hydrochloride. |

¹ The toxicity of this compound has been reported as low as 40 mg./kg. in the rat. (J. Kopera, *Brit. J. Pharmacol.*, 9, 392 (1954).)

The effect of the compounds of this invention on spontaneous motor activity are shown in Table B. In this test which is performed in rats the drug is administered as indicated in Table B and the rat placed in a cage wired with a counter which is responsive to movements of the rat. The counter records and sums up the extent of spontaneous activity of the rat. The duration of the experiment is 18 hours. Each rat acts as his own control by being given a drug one day, and saline the next day or vice versa. At least six rats are used at each dose level tested and the findings are averaged. Activity of a drug is reported as average percent change from the control value.

TABLE B

| Ref. No. (Table A) | Dose mg./kg., subcutaneous | Dose mg./kg., oral | Percent reduction in activity |
|---|---|---|---|
| 1 | 10 | | 45 |
| 1 | | 20 | 14 |
| 1 | | 50 | 25 |
| 1 | | 100 | 59 |
| 2 | 10 | | 24 |
| 2 | | 100 | 17 |
| 3 | 10 | | 52 |
| 3 | | 20 | 0 |
| 4 | 10 | | 39 |
| 4 | | 20 | 0 |
| $C_1$ | 10 | | 0 |
| $C_1$ | | 100 | 0 |
| $C_2$ | 10 | | 41 |
| $C_2$ | | 20 | 54 |
| $C_3$ | 2.5 | | 33 |
| $C_3$ | 10 | | 71 |

The effect of the compounds of this invention on the mescaline inhibition test is shown in Table C. The principle of this test is that normally, when mescaline is injected intraperitoneally at 100 mg./kg., a mouse will respond by scratching its body with its hind legs. The number of times the mouse scratches itself in a specific time interval is counted. If an effective drug is administered 30 minutes before the mescaline, it will reduce or abolish the scratch response as compared to control mice not receiving the tranquilizing drug. Results are expressed as percent inhibition of scratch response as compared to control mice receiving mescaline alone, and the dosage of drug required to reduce the number of scratches by 50% is reported as effective dose in mg./kg. and is designated as $ED_{50}$ mg./kg. At least four mice were tested at each dose level.

As will be noted in Table A many of the toxicities were not explored beyond 1000 mg./kg. Further work, orally, in rats shows Ref. No. 1 has an oral $LD_{50}$ (50% of rats die) at 4200 mg./kg. and Ref. $C_1$ is 1550 mg./kg.

TABLE C

| Ref. No.: | $ED_{50}$ mg./kg. |
|---|---|
| 1 | 8 |
| $C_1$ | 43 |
| $C_2$ | 1 |
| $C_3$ | 0.2 |

The test results above characterize the selected compounds of this invention as efficient tranquilizing agents with little or no toxicity.

What is claimed is:

The process which comprises heating an α-hydroxy-ester of the formula $R_1R_2C(OH)COOY$ with a substituted aminoalkylamine of the formula $A(CH_2)_nNH_2$ in a dialkyl carbonate of the formula $O=C(OZ)_2$, wherein Y and Z are lower alkyl, in the presence of sodium ethoxide to produce an oxazolidinedione of the formula

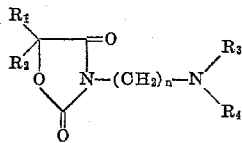

wherein $R_1$ and $R_2$ are members of the group consisting of hydrogen and methyl, $n$ is an integer and is a member of the group consisting of 3 and 4, A is a secondary amino radical $-NR_3R_4$, wherein $-NR_3R_4$ is selected from the group consisting of 1-piperidino, 1-hexamethyleneimino, 1-pyrrolidino, 4-morpholino, 1-indolino, tetrahydroquinoinyl, tetrahydroisoquinolinyl, cyclohexyl dimethylamino, methylisopropylamino, diethylamino, methylbenzylamino, ethylcyclohexylamino, methyl(α-methylphenethyl)amino, methylamino, ethylamino, dibutylamino, methylcyclohexylamino and isopropylbenzylamino.

References Cited in the file of this patent

UNITED STATES PATENTS

| 2,058,013 | Henke et al. | Oct. 20, 1936 |
| 2,338,220 | Wallingford | Jan. 4, 1944 |
| 2,578,611 | Stoughton | Dec. 11, 1951 |

OTHER REFERENCES

Wallingford et al.: Journal of the American Chemical Society, Volume 67, pages 522 and 523 (1945).

Degering: An Outline of Organic Nitrogen Compounds, page 399, University Lithoprinters, Ypsilanti, Michigan (1950).

Iwaya: Chemical Abstracts, Volume 44, column 1958f (1950).

Lespagnol: Chem. Abstracts, Volume 46, column 11179i (1952).

UNITED STATES PATENT OFFICE

CERTIFICATE OF CORRECTION

Patent No. 3,054,794                        September 18, 1962

Seymour L. Shapiro et al.

It is hereby certified that error appears in the above numbered patent requiring correction and that the said Letters Patent should read as corrected below.

Columns 3 and 4, TABLE I, about line 40, for "$R_1=CH_3$, $R_3=H$, n=3" read -- $R_1=CH_3$, $R_2=H$, n=3 --; same table, second column, about line 45, for "$C_1H_5$" read -- $C_2H_5$ --; column 8, line 58, for "93.8 (90%)" read -- 93.8 g. (90%) --; column 9, line 2, for "5,5-dimethyl3-", in italics, read -- 5,5-dimethyl-3- --; in italics.

Signed and sealed this 5th day of February 1963.

(SEAL)
Attest:

ERNEST W. SWIDER                              DAVID L. LADD
Attesting Officer                                 Commissioner of Patents